United States Patent [19]
Unfried et al.

[11] 3,848,514

[45] Nov. 19, 1974

[54] FLUIDICALLY CONTROLLED PNEUMATIC TO MECHANICAL CONVERTERS

[75] Inventors: Happy H. Unfried, Los Angeles; John F. Cogger, Northridge, both of Calif.

[73] Assignee: The United States of America as represented by the Secretary of the Navy, Washington, D.C.

[22] Filed: Feb. 21, 1973

[21] Appl. No.: 334,507

Related U.S. Application Data

[62] Division of Ser. No. 138,413, April 29, 1971, Pat. No. 3,735,707.

[52] U.S. Cl. ............................ 91/3, 91/318, 74/129
[51] Int. Cl. ...................... F15b 13/042, F01l 25/04
[58] Field of Search ............... 91/3, 318; 74/88, 800

[56] References Cited
UNITED STATES PATENTS

| | | | |
|---|---|---|---|
| 95,586 | 10/1869 | Henderson | 74/88 |
| 2,941,424 | 6/1960 | Dixon | 74/88 |
| 3,448,481 | 6/1969 | Jones, Jr. | 91/3 |
| 3,554,058 | 1/1971 | Newell | 91/3 |

*Primary Examiner*—Paul E. Maslousky
*Attorney, Agent, or Firm*—R. S. Sciascia; P. Schneider; R. B. Rothman

[57] ABSTRACT

A device for converting the output of a fluid amplifier into rotational mechanical energy. Ratchet teeth are arranged upon both internal ends of a cylinder for engagement with ratchet teeth provided on both faces of a disc axially movable within the cylinder. A shaft, connected at one end to the central portion of the disc and at its other end to a diaphragm, transmits to the disc the oscillatory motion imparted to the diaphragm by switching the output of a fluid amplifier from one side of the diaphragm to the other. Upon oscillation, the engagement of the disc and cylinder teeth causes the cylinder to rotate.

7 Claims, 6 Drawing Figures

3,848,514

FLUIDICALLY CONTROLLED PNEUMATIC TO MECHANICAL CONVERTERS

STATEMENT OF GOVERNMENT INTEREST

The invention described herein may be manufactured and used by or for the Government of the United States of America for governmental purposes without the payment of any royalties thereon or therefor.

This is a division of application Ser. No. 138,413 filed Apr. 29, 1971 now U.S. Pat. No. 3,735,707.

BACKGROUND OF THE INVENTION

The present invention relates generally to pneumatic to mechanical converters and more particularly to such converters which are capable of converting the output of a fluid amplifier into rotational mechanical energy.

In the field of fluidics, there has been a need for devices which can convert the output of fluid amplifiers into rotational mechanical energy in incremental steps as in stepping motors and the like. In some applications, there has been a need for a device which performs as above with the additional capability of operating at a constant speed, over a wide range of supply pressures. Such a device may be utilized as both a pneumatic to mechanical energy converter and as a time base.

SUMMARY OF THE INVENTION

The present invention provides a pneumatic to mechanical conversion through the use of a cylinder having ratchet teeth on both its internal ends. A disc which is arranged for axial movement within the cylinder is provided with ratchet teeth on both its faces for engagement with the cylinder teeth. By causing the disc to oscillate within the cylinder, the engagement of the disc and cylinder teeth causes a relative rotation in incremental steps between the cylinder and disc. A fluid amplifier of known design is used to impart oscillatory motion to a diaphragm which is in turn rigidly connected to the disc by a shaft. The use of the diaphragm not only eliminates the need for complex sliding seals within the converter device but also reduces the effects of supply pressure changes on the frequency of operation. The term "teeth" as used hereinafter in this specification refers to teeth having a ratchet-type configuration.

OBJECTS OF THE INVENTION

An object of the present invention is to provide a pneumatic to mechanical converter having a rotational output in incremental steps.

Other objects, advantages, and novel features of the present invention will become apparent from the following detailed description of the invention when considered in conjunction with the accompanying drawings.

BRIEF DESCRIPTION OF THE DRAWINGS

Throughout the figures of the drawings like parts are represented by like reference numerals while equivalent parts are provided with prime designations.

DETAILED DESCRIPTION OF THE INVENTION

Figure 1:
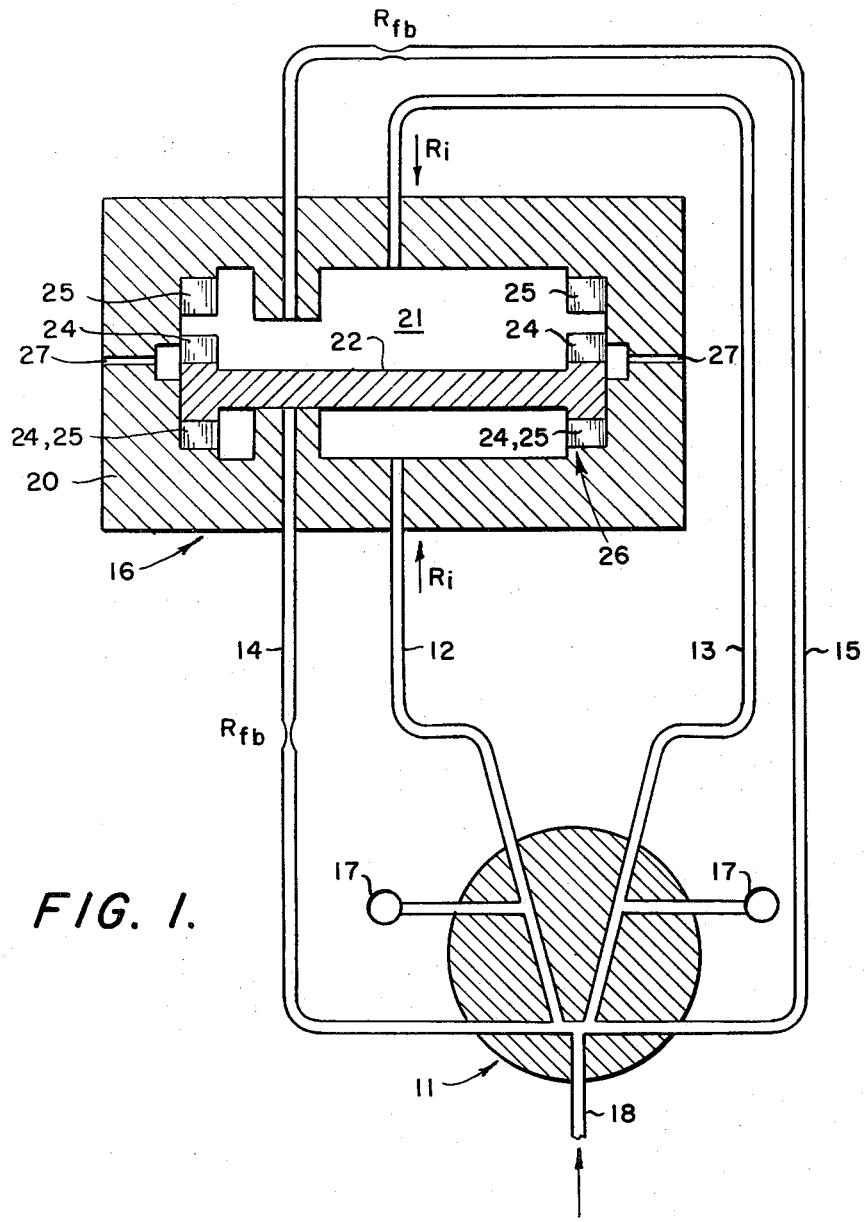
FIG. 1 illustrates an embodiment of the invention.

FIG. 1, which illustrates an embodiment of the invention, shows a bistable fluid amplifier 11 operatively connected through output legs 12 and 13 and feedback lines 14 and 15 to the converter of the present invention 16. The reference characters $R_i$ and $R_{fb}$ represent the input and feedback resistances in lines 12 – 15. The fluid amplifier 11 with the connecting lines 12 – 15, vents 17 and supply inlet 18 is of the wall attachment type arranged as a bistable switch. This basic fluid amplifier is well known and described in the general literature.

The converter 16 comprises a housing 20 having an internal chamber 21. Positioned within the internal chamber 21 is a piston-like rotor 22 which spans the major dimension of the internal chamber 21. The rotor 22 is provided, on both its faces, with a set of teeth 24 which are located generally at the outer edge of each face. A third and fourth set of teeth 25 are provided on the chamber and covers adjacent the rotor teeth 24.

The rotor 22 is free to oscillate within the internal chamber 21 between the point where one set of rotor teeth 24 is in engagement with one set of chamber teeth 25 and the point where the other sets of teeth 24 and 25 are in engagement as shown. The minimum clearance between the rotor diameter and the internal diameter of the chamber, together with the vents 27 positioned at the mid-point of rotor axial movement, prevent fluid flow between the two sides of the rotor.

Figure 2:
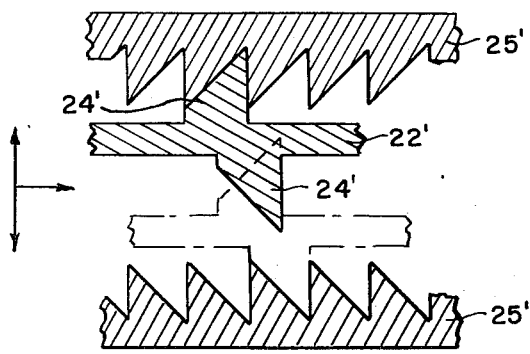
FIG. 2 illustrates an operational detail of the present invention.

Referring now to FIG. 2, there is shown a tooth arrangement generally similar to that shown in FIG. 1. For clarity only one tooth 24' is shown on each face of internal member 22'. The two outer sets of teeth 25' correspond generally to the chamber teeth 25, while the teeth 24' on the internal member 22' correspond generally to the rotor teeth 24. It can be seen that as the member 22' moves from the upper set of teeth to the lower set of teeth the nature of the engagement between the teeth 24' and 25' will cause the member 22' to move to the right. In the environment of FIG. 1, a configuration of teeth such as that shown in FIG. 2, will cause the rotor 22 to rotate within the internal chamber 21. Thus, as the fluid amplifier 11 switches its output from one side of the rotor 22 to the other, the rotor 22 is caused to oscillate and this oscillation leads to a rotation of the rotor 22. The tip-to-tip spacing between the two outer sets of teeth 25' is preferably less than the tip-to-tip dimension between the two sets of chamber teeth 24' as shown in FIG. 2.

Figure 3:
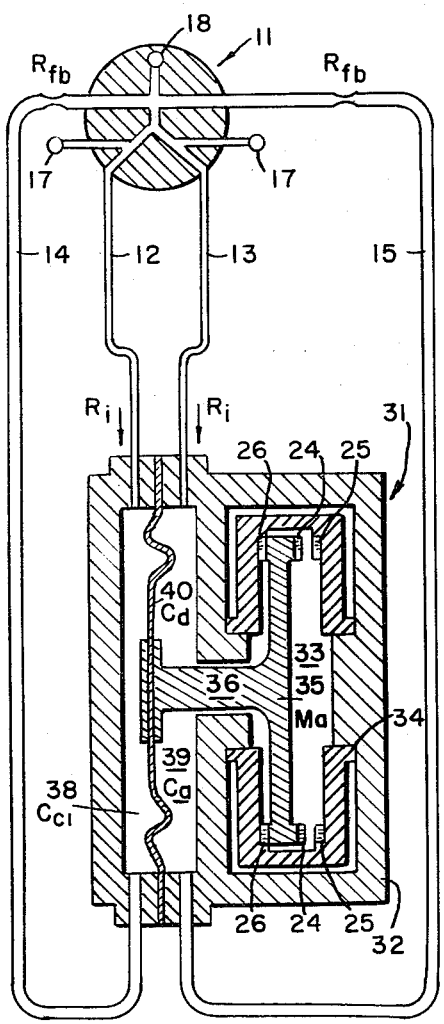
FIG. 3 shows another embodiment of the invention.

Referring now to FIG. 3, which shows another preferred embodiment of the invention, there is shown a fluid amplifier 11 connected to a converter 31. The fluid amplifier 11 is generally similar to that shown in FIG. 1. Identical reference numerals have been used to designate functionally similar elements.

The converter 31, of FIG. 3, is comprised of a housing 32 containing a cylindrical rotor 34 and a circular armature disc 35 within a first internal chamber 33. A shaft, 36 one end of which is connected to one face of the armature disc 35, extends through a bore in the housing 32 from the first internal chamber 33 into a second internal chamber. A diaphragm 40 divides this second chamber into two compartments 38 and 39 and is connected to the other end of the shaft 36.

Any suitable material may be used to make the diaphragm. It has been found that a polyester film such as 1 mil thick mylar is suitable for this purpose. Additionally, the diaphragm may be formed in a die to provide it with convolutions to enhance its flexural properties.

It will be noted that in the embodiment of FIG. 3, each "side" of the fluid amplifier 11 is connected to opposite sides of the diaphragm 40. This is analogous to the connection to the opposite sides of the rotor 22 in FIG. 1. As the output of the fluid amplifier 11 switches between output legs 12 and 13, the action of the diaphragm causes the armature disc 35 to oscillate within the chamber 33. The armature disc 35 is provided with teeth 24 for engagement with teeth 25 on the rotor 34. This tooth arrangement is identical to that shown on the rotor 22 and internal cylinder 21 of FIG. 1 and illustrated in FIG. 2. Thus, oscillation of the armature disc 35 and engagement of the teeth 24 and 25 (as shown at reference numeral 26) causes the rotor 34 to rotate. The minimum torque exerted on the rotor by the armature disc is given by the equation:

$$T = R_r \sin\gamma - \mu \cos\gamma/\mu \sin\gamma + \cos\gamma \, A_d S_p - \tfrac{3}{4} \, tk$$

where $R_r$ = rotor radius;
$\gamma$ = tooth angle;
$\mu$ = coefficient of friction armature to rotor teeth;
$A_d$ = diaphragm active area;
$S_p$ = pressure gradient across diaphragm;
$t$ = tooth depth; and
$k$ = diaphragm stiffness, A major advantage in the use of the diaphragm 40, as shown in FIG. 3, is the elimination of an otherwise necessary sliding seal at the outside diameter of the armature disc 35. In the embodiment of FIG. 3, the only seal necessary is where the shaft 36 passes through the bore in the housing 32. By maintaining the clearance between the shaft and the bore at about 2 to 3 mils a dynamic seal is formed since a flow path of this size has a high impedance to the approximately 100 cps signal that exists in the diaphragm compartment 39.

Figure 5:
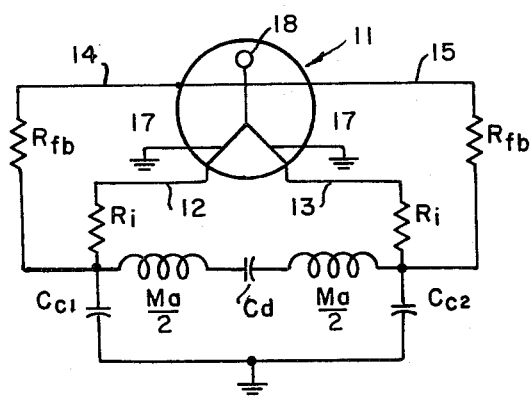
FIGS. 5 and 6 are equivalent circuit representations of the embodiment of FIG. 3, FIG. 5 showing the initial load during switching and FIG. 6 showing the final load during switching.
Figure 6:
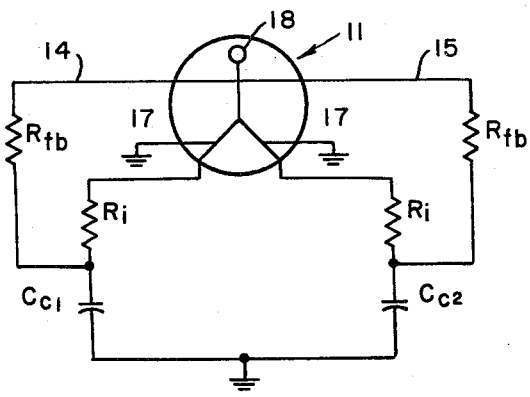

Referring briefly to FIGS. 5 and 6, there is shown the equivalent circuits for the case of the initial load and final load during a half cycle of operation of the device in FIG. 3. Reference characters shown in FIGS. 5 and 6 are shown on FIG. 3 adjacent their respective reference numerals. These figures are the equivalent circuit for the case of a solid armature. Note that in the final load case (FIG. 6) the diaphragm capacitance $C_d$ is missing. Diaphragm capacitance $C_d$ contributes to the frequency stability of circuit. Thus, through the use of the diaphragm 40, the converter 31 will operate at a more constant speed, over a wider range of supply pressures at the supply inlet 18, than would otherwise be possible.

Figure 4:
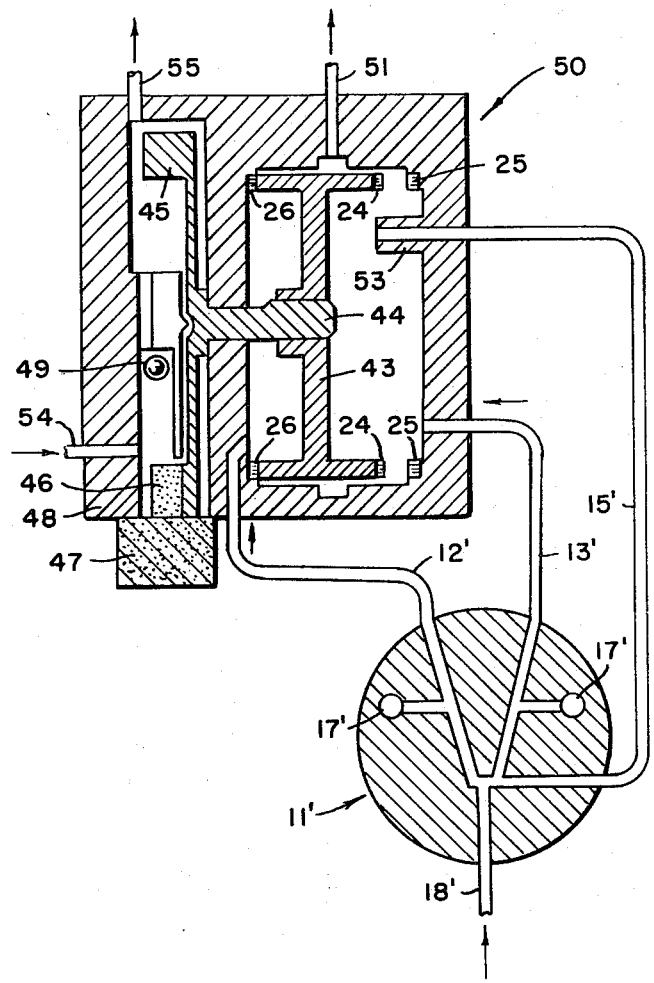
FIG. 4 shows still another embodiment of the invention.

FIG. 4, illustrates still another embodiment of the present invention. This embodiment employs a monostable fluid amplifier 11' connected to opposite sides of a rotor 43 through lines 12' and 13'. The primed reference numerals designate elements which are functionally similar to the elements containing identical unprimed reference numerals in FIGS. 1 and 3. The rotor 43 is keyed to the shaft 44 but is free to slide axially along it for oscillation. On the end of the shaft 44, opposite of the rotor 43, there is a disc 45. The stepping action of the rotor 43 induced by rotor oscillation causes the disc 45 to rotate because of the keyed connection between the rotor 43 and shaft 44. In the alternative, the embodiment in FIG. 3 could be employed to drive a shaft rigidly connected to rotor 34.

An explosive primer 46 is mounted in a bore in the rim of the disc 45 and an explosive booster 47 is mounted outside the housing 48. A firing pin 49 is located within the housing 48. In the armed position, the firing pin 49, primer 46 and booster 47 are in alignment as shown in FIG. 4. In the unarmed mode, the primer 46 is held out of line with respect to both the firing pin 49 and booster 47. The monostable switch 11' and converter 50 are intended for use in a bomb the longitudinal axis of which is perpendicular to the axis of the rotor 43. The ram air, shown entering at 18' and 54, is derived from the falling of the bomb.

The ram air entering at 18' powers the monostable switch 11' to rotate the disc 45 until the primer 46, booster 47 and firing pin are in alignment. A limit pin (not shown) then stops the rotor and disc rotation. The device is now armed.

The ram air inlet 54 serves as a pressure source to push the firing pin 49 towards the center of the disc 45 and away from the primer 46. This permits the firing pin 49 to be loose so that it could and would assume a position at the rim of the disc when no ram air was present. If, in some manner the, disc 45 had been rotated to the armed position by faulty manufacture or failure, a bomb containing this present invention could still not detonate unless ram air were present to provide sufficient space between the pin 49 and the primer 46. The space is needed to permit the firing pin acceleration to be achieved which results in sufficient energy to fire the primer 46.

The vent 55 allows leakage air around the shaft connecting the disc and rotor to escape to atmosphere and also allows the back side of the pin 49 to remain at atmospheric pressure when it is accelerated towards the primer 46. The vent 51, above the rotor 43, acts to prevent flow between the two sides of the rotor 43.

An alternative arrangement to stop the rotor 43 and disc 45 in the aligned position would be to provide the face of the rotor 43 with a depression. This depression may be so located that when the rotor has stepped to its desired position it cannot block flow through the feed back port 53 to the control port of the monostable switch 11'. Should such blockage occur, it would prevent the switch 11' from transferring flow to its right output port and the rotor 43 would thus cease to oscillate. The stopping point may be changed by making the feedback port 53 rotatable about the axis of the rotor 43.

From the above, it should be apparent that the device of the present invention may be used as a pulse counter or an accumulator by a person with ordinary skill in the art of fluidic digital techniques. In addition, by merely attaching a pointer or number wheel to the output shaft, the device may be operated as a readout device for fluidic pneumatic or hydraulic systems which have a pulse output.

Obviously many modifications and variations of the present invention are possible in the light of the above teachings.

What is claimed is:

1. A pneumatic to mechanical converter comprising:

a cylindrical housing having end covers thereon;

a first set of ratchet teeth attached to the internal surface of one of said end covers and arranged concentrically of the axis of said cylindrical housing;

a second set of ratchet teeth attached to the internal surface of the other of said end covers and arranged concentrically of the axis of said cylindrical housing;

a circular disc concentrically arranged within said cylindrical housing for axial movement therein, said disc having oppositely disposed faces each confronting the internal surface of one said end covers of said cylindrical housing;

a fluid amplifier;

means for operatively coupling said fluid amplifier to said disc for axially oscillating said disc within said cylindrical housing;

a third set of ratchet teeth attached to one of said faces of said circular disc and arranged for engagement with said first plurality of teeth; and a fourth set of ratchet teeth attached to the other of said faces of said circular disc and arranged for engagement with said second plurality of teeth;

the cross-section of each set of ratchet teeth being such that alternating engagement between the first and third set of ratchet teeth and between the second and fourth set of ratchet teeth causes relative rotation in incremental steps between said cylindrical housing and said circular disc.

2. A pneumatic to mechanical converter according to claim 1 wherein the tip-to-tip spacing between said first and second set of ratchet teeth is less than the tip-to-tip dimension between said third and fourth set of ratchet teeth.

3. A pneumatic to mechanical converter according to claim 1 wherein said cylindrical housing rotates in incremental steps with respect to said circular disc.

4. A pneumatic to mechanical converter according to claim 3 including a plurality of vent openings through the wall of said cylindrical housing at the mid-point of the axial movement of said circular disc for preventing fluid flow between the faces of said disc.

5. A pneumatic to mechanical converter according to claim 1 wherein said circular disc rotates in incremental steps with respect to said cylindrical housing.

6. A pneumatic to mechanical converter according to claim 1 wherein at least one of said end covers of said cylindrical housing has an axial opening therethrough, and wherein said means includes:

a second housing having first and second internal chambers therein, said chambers communicating with each other through a bore in said second housing, said cylindrical housing being enclosed within said first internal chamber and rotatably mounted therein about its axis;

a diaphragm disposed within said second internal chamber and arranged along an axis thereof so as to form two separate compartments within said second internal chamber; and a shaft extending through said axial opening and through said bore, said shaft being connected at one end to said circular disc and at the other end to said diaphragm.

7. A pneumatic to mechanical converter according to claim 6 wherein the clearance between said shaft and said bore is so chosen to form a dynamic seal therebetween.

* * * * *